Dec. 29, 1931.  M. HANSEN ET AL  1,838,620

EGG SEPARATOR

Filed Dec. 8, 1928

Inventor
Morten Hansen
William G. Young
By Lyon & Lyon
Attorneys

Patented Dec. 29, 1931

1,838,620

UNITED STATES PATENT OFFICE

MORTEN HANSEN AND WILLIAM G. YOUNG, OF LOS ANGELES, CALIFORNIA

EGG SEPARATOR

Application filed December 8, 1928. Serial No. 324,668.

This invention relates to egg separators, or, in other words, to an apparatus or machine for separating the whites of eggs from the yolks.

In certain businesses, for example in the bakery business, eggs are measured by weight instead of by count, and there is quite a large business in the furnishing of yolks and whites of eggs in bulk.

This invention is used in connection with the operation of inspecting the eggs, visually for signs of deterioration as, for example, for blood spots and cloudiness, and by the sense of smell to ascertain whether or not the eggs are musty. One musty egg or even a portion thereof when deposited with others will soon cause the entire lot to become spoiled and, accordingly, it is quite essential that no particle of a musty egg be allowed to contaminate those eggs that are not musty. Accordingly, one of the objects of the present invention is to make provision for preventing any drippings from a broken musty egg reaching the good eggs that have previously been broken.

A very important object of the invention is to make it possible to inspect the egg, after breaking, before the yolk and white are separated, thus making it possible to inspect the egg for mustiness by smelling of it once. Heretofore this inspection for mustiness was accomplished after the yolks and whites were separated, thus making it necessary to smell of the whites and yolks separately.

Another very important object is to eliminate waste. With apparatus heretofore in use, employed for facilitating the separation and inspection of eggs, the whites of one or more eggs were deposited in one receptacle and the yolks in another receptacle. Thus, if, upon test, one of the eggs was found to be musty, cloudy, or to have blood spots, it was necessary to throw both eggs away. By use of the present invention, the eggs can be broken, inspected and separated just as expeditiously as in the prior known apparatus and, at the same time, the eggs can be separately inspected before separation.

Another important object of the invention is to effect discharge movements of the hopper, in which the egg is broken, and of the cup that holds the yolk, in sequence by movement of a single operating member.

Another important object is to provide for removably mounting individual separators so that, in the event of the breaking thereinto of a musty egg, the separator may be removed for sterilization and another one substituted for it.

Another object is to construct the mechanism, that operates the hopper and cup, in loosely connected, separable portions, one portion mounted on each of the removable separator units and the other portion mounted on a table which supports a series or battery of the separator units.

Another object is to effect delivery of the egg whites and yolks, free from dust and harmful bacteria, from the separating unit or units to the receptacle or receptacles which receive them after inspection.

Other objects and advantages will appear in the subjoined, detailed description.

The accompanying drawings illustrate the invention:

Figure 1:
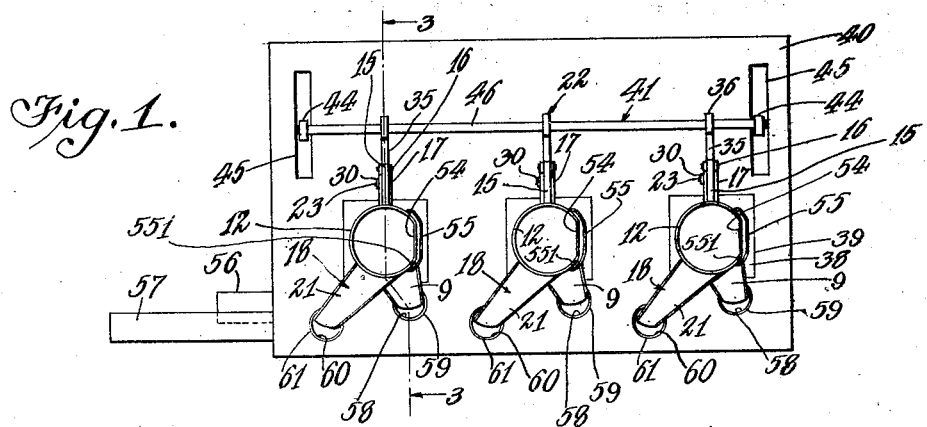
Figure 1 is a plan view of a battery of egg separators constructed in accordance with the provisions of this invention.
Figure 2:
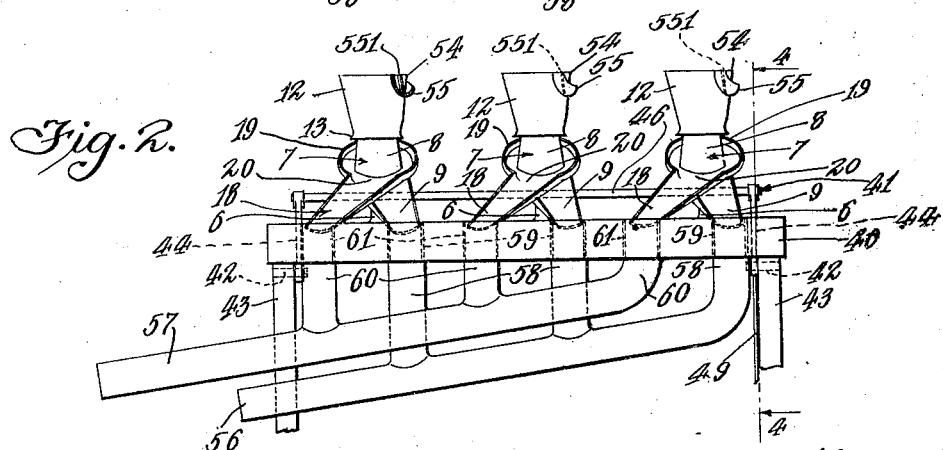
Figure 2 is a front elevation of Figure 1.

The individual separator units are constructed as follows:

Referring to the drawings, there is provided a post or standard 6 that supports a spout 7 comprising an upper vertical portion 8 and a lower slanting portion 9. In the open end of the vertical spout portion 8 is pivoted at 10 a yolk cup 11. Movably mounted above the spout 7 is a hopper 12 which, in the present instance, is funnel-shaped. The lower end of the hopper 12 terminates in an outwardly flared cutting flange 13 which telescopes over the upper end of the spout. Just above the flange 13, the bore of the hopper is of slightly less diameter than the outside diameter of the spout so that said hopper will contact with and rest on the rim 14 of the spout when said hopper is in the closed position shown in Figure 3.

In the present instance, the hopper 12 is pivotally mounted, being provided with a laterally extending arm 15 connected by a pivot 16 to a bracket 17 which projects laterally from the upper portion of the standard 6.

Surrounding the spout 7 is a slanting trough 18, the portion 19 that surrounds the spout being annular and having an opening 20 at its lower end that communicates with a laterally and downwardly extending portion 21 of said trough.

The mechanism for operating the hopper 12 and cup 11 comprises a portion that is carried by the post 6, said portion being indicated in general by the character 22, and being constructed as follows:

Pivoted at 23 with the bracket 17 is a lever 24, the upper end of said lever engaging the under face of the arm 15. The under face of said arm 15 is provided with a downwardly projecting shoulder 25, which constitutes the high point of a cam face. The other portions of said cam face are indicated at 26, 27 and enable the upper curved end 28 of the lever 24 to ride up and down when said lever is operated to swing the hopper upwardly and allow it to descend.

Figure 3:
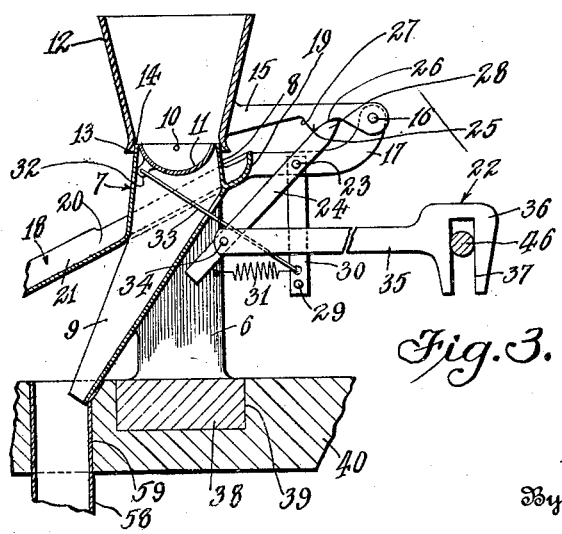
Figure 3 is an enlarged vertical section on the line indicated by 3—3, Figure 1, portions of the table and of the operating mechanism being broken away.

When the lower end of the lever 24 is actuated to the right in Fig. 3, its upper end first elevates the hopper and then permits said hopper to drop, at which time the lever 24 is approximately in vertical position and in engagement with a shoulder or abutment 29 on an arm 30 which is pivoted at its upper end of the bracket 17 by the pivot 23, in this instance. A coil spring 31 is connected at one end to the post 6 and at its other end to the arm 30 so as to yieldingly hold said arm 30 against movement to the right in Figure 3.

Connected at one end to the arm 30 and at its opposite end to an ear 32 on the bottom of the cup 11, is a rod or wire 33 which functions to tilt the cup when the arm 30 is swung to the right, in Figure 3, against the tension of the spring 31. Thus, it will be readily understood that opening movement of the hopper and tilting of the cup 11 are successively performed by movement of the single lever 24 to the right in Figure 3.

Pivoted at 34 to the lower portion of the lever 24 is a rod 35 which extends approximately horizontal and which is provided at its outer end with a head 36 having a vertical slot 37.

In practice the above described construction will be provided in multiple so as to produce a battery of the units just described. For this reason, the lower end of each standard 6 constitutes a base 38, in this instance square. The bases 38 fit in square sockets 39 in a table 40. It is preferable to provide the table with three of the egg separating units, for the reason that the operator will readily pick up three eggs in one hand from the egg case, not shown, and will break these three eggs successively, one in each of the hoppers.

A portion, only, of the mechanism for operating the hopper and cup has been hereinbefore described and the other portion of said mechanism is indicated in general by the character 41 and it is loosely engaged by the mechanism portion 22 so that any one of the units, with its attached portion 22 of the operating mechanism, may be quickly detached and removed from the table and another similar unit substituted therefor, as becomes necessary when one of the units must be detached for sterilization in the event of a musty egg having been broken into it.

Figure 4:
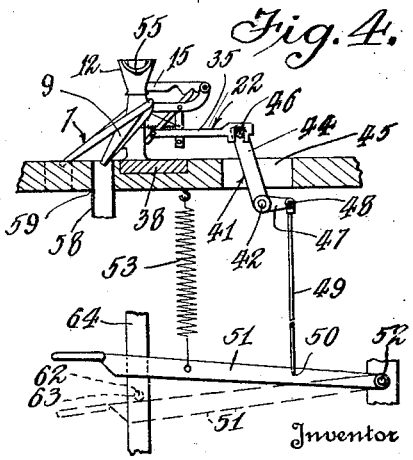
Figure 4 is a vertical section on the line indicated by 4—4, Figure 2.

The mechanism portion 41 is constructed as follows: Pivoted at 42 to two of the legs 43 of the table 40 are arms 44 that extend upwardly through openings 45 in said table. The upper ends of the arms 44 are connected by a rod 46. One of the arms 44 constitutes one of the arms of a bell crank lever and the other arm of said lever is indicated at 47. The arm 47 is pivoted at 48 to the upper end of a rod 49 and the lower end of said rod 49 is pivoted at 50 to an operating member in the form of a lever 51, the fulcrum of which is indicated at 52. The operating member 51 is connected by a coil spring 53 to the table and said spring operates to yieldingly hold the member 51 in its upper or retracted position. Downward movement of the member 51 causes the rod 46 to move to the right in Figure 4.

The mechanism portion 22 is loosely and detachably connected with the operating mechanism portion 41 by reason of the rod 46 being received in the slots 37 of the various rod heads 36. These heads 36 simply hook over the rod 46 so that, when any of the egg breaking units is raised from the table, the rod 46 becomes disengaged from the slot 37 of said unit.

The major portion of the hopper rim is curved, but a portion 54 is straight to form a convenient edge on which the eggshell may be broken by the operator prior to emptying the contents of said shell into the hopper.

A short distance below the edge portion 54, there is provided a drip receptable 55 which is attached to the outer face of the hopper. The purpose of said drip receptacle is to catch the small amount of the egg that either drips from the shell, after the egg is broken, or runs down the outer side of the hopper at the point where the egg is broken on the rim of said hopper. Thus, if it has been ascertained that a musty egg has been broken into the hopper, drippings from the shell will not drop into the trough 18 and so reach and contaminate the whites of the rest of the eggs that have been or will be broken and discharged into a single receptacle. The drip receptacle 55 is in the form of a short trough. Preferably, the trough communicates through a port 551 with the interior of the hopper.

The table 40 is provided with a pair of discharge manifolds 56, 57 to receive the yolks and the whites, respectively, of the eggs as the same discharge from the spout 7 and trough 18. The branches 58 of the manifold 56 have their upper ends received in vertical openings 59 in the table, the spouts 7 of the various egg separating units having their lower ends projecting into the upper ends of the manifold branches 58. Also the branches 60 of the manifold 57 have their upper ends projecting into vertical openings 61 in the table and the lower ends of the troughs 18 project into the manifold branches 60.

Suitable receptacles will be placed at the lower ends of the manifolds 56, 57 which extend aslant, so as to receive the yolks and whites of the eggs.

The invention operates as follows: The operator will pick up three eggs in her right hand and crack the shells successively on the edge portions 54 of the different hoppers, at the same time allowing the contents of the eggshells to drop into the hoppers. The operator then smells the eggs thus broken into the hoppers to ascertain whether or not any of them is musty. If a musty egg has been broken, the operator will detach the separating unit, containing the musty egg, from the table and set it to one side for sterilization and will substitute for it a similar egg separating unit. The eggs having passed the test, or the musty one eliminated, as above described, the operator will depress the member 51, thus causing the hoppers to rise and fall and to then cause the yolk cups to tilt. When the hoppers rise, the whites of the eggs discharge over the edges of the cup 11 and spout 7 into the trough 18, thence into the manifold 57 and, when the hoppers descend, they cut off the whites from the yokes that remain in the cups. When the cups 11 are tilted, the yolks discharge into spouts 7 and thence into the manifold 56.

As soon as the operating member 51 has caused the above mentioned movements of the hoppers and cups to occur, the operator releases said operating member and the spring 53 then retracts it, thus returning the levers 24 to the position shown in Figure 3. Also the springs 31 retract the arms 30 so as to cause the cups to assume an upright position, in which they close the upper ends of the spouts. The operator may, for example, pick up the eggs from the egg case, not shown, with her right hand while operating the member 51 with her left hand or otherwise, thus enabling the operator to break and inspect the maximum number of eggs in a given length of time.

From the foregoing, it will be readily understood that, though each egg is separately inspected for mustiness and other imperfections, the yolks and whites of the eggs can be separated as fast as the operator can break the eggs and inspect them. It will also be readily understood from the foregoing description that no portion of a musty egg can accidentally reach the manifolds for even the drippings that may result when the eggshell is broken on the edge portion 54 will be caught by the receptacle 55 and, if the egg is a musty one, the operator immediately removes the unit in which the musty egg has been broken, thus preventing said drippings from the shell from running down into the manifold 57.

A considerable number of eggs are sold in bulk, but unseparated, and, in the event that the whites and yolks are not to be separated, the eggs will be broken one at a time, into the hoppers 12 and the hoppers will not be raised but merely the cups 11 tilted, thus discharging the whole eggs into the spouts 9, thence into the conduits 58. A stop 62 may be provided to limit upward movement of the lever 51 to such an extent that the upper ends of the levers 24 will be maintained to the left of the high points 25 of the cams, as in Figure 3. Thus, operation of the lever 51 downwardly, from the position shown in dotted lines in Figure 4, will simply effect tilting of the cups. The stop 62, in this instance, is constituted by a pin mounted in a hole 63 in a standard 64 that is provided adjacent to one side of the lever 51.

We claim:

1. An egg separator comprising a table, standards detachably mounted on the table, yolk cups pivotally connected with the standards, hoppers movably mounted on the standards with their lower ends adapted to surround the cups, a means beneath each cup to receive the yolk when the cup is tilted, a means beneath each hopper to receive the white when the hopper is moved away from the associated cup, a mechanism mounted on each standard operable to raise and lower the hopper and tilt the cup, and a mechanism mounted on the table and detachably connected with each of the first mentioned mechanisms for simultaneously operating the same.

2. An egg separator comprising a table, standards detachably mounted on the table, yolk cups pivotally connected with the standards, hoppers movably mounted on the standards with their lower ends adapted to surround the cups, a means beneath each cup to receive the yolk when the cup is tilted, a means beneath each hopper to receive the white when the hopper is moved away from the associated cup, a mechanism mounted on each standard operable to raise and lower the hopper and tilt the cup, and a mechanism mounted on the table and detachably connected with each of the first mentioned mechanisms for simultaneously operating the same, each of the first mentioned mechanisms and the second mentioned mechanism including loosely engaging members.

3. An egg separator comprising a table, standards detachably mounted on the table, yolk cups pivotally connected with the standards, hoppers movably mounted on the standards with their lower ends adapted to surround the cups, a means beneath each cup to receive the yolk when the cup is tilted, a means beneath each hopper to receive the white when the hopper is moved away from the associated cup, a mechanism mounted on each standard operable to raise and lower the hopper and tilt the cup, and a mechanism mounted on the table and detachably connected with each of the first mentioned mechanisms for simultaneously operating the same, the second mentioned mechanism including a rod, and each of the first mentioned mechanisms including a member loosely hooked over the rod.

4. An egg separator comprising a table, standards detachably mounted on the table, downwardly extending spouts, yolk cups pivoted in the upper ends of the spouts, troughs surrounding the spouts, hoppers movably mounted with their lower ends adapted to engage the upper ends of the spouts, a mechanism mounted on each standard operable to raise and lower the hopper and tilt the cup, and a mechanism mounted on the table and detachably connected with each of the first mentioned mechanisms for simultaneously operating the same, each of the first mentioned mechanisms and the second mentioned mechanism including loosely engaging members.

5. An egg separator comprising a table, standards detachably mounted on the table, downwardly extending spouts, yolk cups pivoted in the upper ends of the spouts, troughs surrounding the spouts, hoppers movably mounted with their lower ends adapted to engage the upper ends of the spouts, a mechanism mounted on each standard operable to raise and lower the hopper and tilt the cup, and a mechanism mounted on the table and detachably connected with each of the first mentioned mechanisms for simultaneously operating the same, the second mentioned mechanism including a rod and each of the first mentioned mechanisms including a member loosely hooked over the rod.

6. An egg separator comprising a table provided with openings therethrough, manifolds having branches extending into the openings, downwardly extending spouts mounted above the table and loosely projecting into the branches of one of the manifolds, yolk cups pivoted in the upper ends of the spouts, and slanting troughs surrounding the spouts and loosely projecting into the branches of the other manifold.

7. An egg separator comprising manifolds having upwardly extending branches, downwardly extending spouts loosely projecting into the branches of one of the manifolds, yolk cups pivoted in the upper ends of the spouts, and troughs surrounding the spouts and loosely projecting into the branches of the other manifold.

Signed at Los Angeles, California, this 30th day of November, 1928.

MORTEN HANSEN.
WILLIAM G. YOUNG.